United States Patent [19]

Evans

[11] Patent Number: 4,823,297
[45] Date of Patent: Apr. 18, 1989

[54] DIGIT-REVERSAL METHOD AND APPARATUS FOR COMPUTER TRANSFORMS

[75] Inventor: David M. W. Evans, Palo Alto, Calif.

[73] Assignee: Board of Trustees of the Leland Stanford Junior University, Palo Alto, Calif.

[21] Appl. No.: 941,021

[22] Filed: Dec. 12, 1986

[51] Int. Cl.$^4$ ............................................. G06F 15/332
[52] U.S. Cl. ..................................... 364/725; 364/726
[58] Field of Search ........................ 364/725, 726, 727

[56] References Cited

U.S. PATENT DOCUMENTS

| 3,731,284 | 5/1973 | Thies | 364/726 |
| 3,988,601 | 10/1976 | Perry | 364/726 |
| 4,181,976 | 1/1980 | Collins et al. | 364/726 |
| 4,602,350 | 7/1986 | Gray | 364/726 |
| 4,646,256 | 2/1987 | Bracewell | 364/725 |

Primary Examiner—David H. Malzahn
Attorney, Agent, or Firm—Fliesler, Dubb, Meyer & Lovejoy

[57] ABSTRACT

A computer method and apparatus for permuting data values in fast transforms recognizing patterns in the relationship between indicies i and j to avoid calculating j when i equals j and avoid calculating j when j is less than i. The indicie j is calculated from i in a single multiplication by a power of B and a single addition.

20 Claims, 5 Drawing Sheets

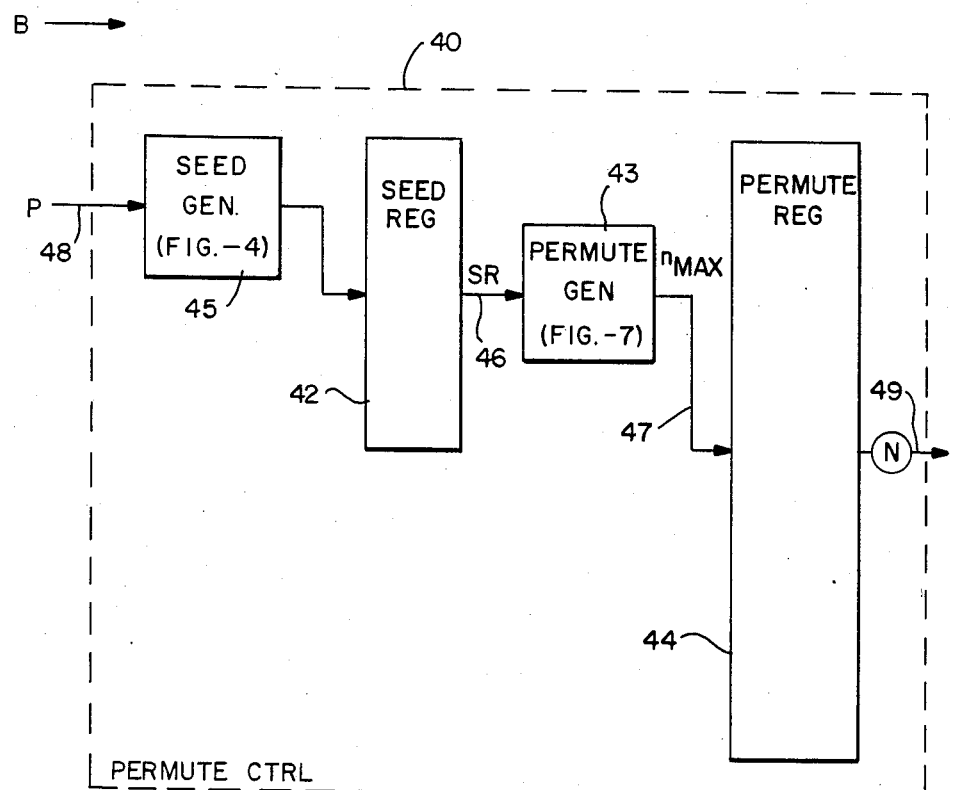
FIG.-3
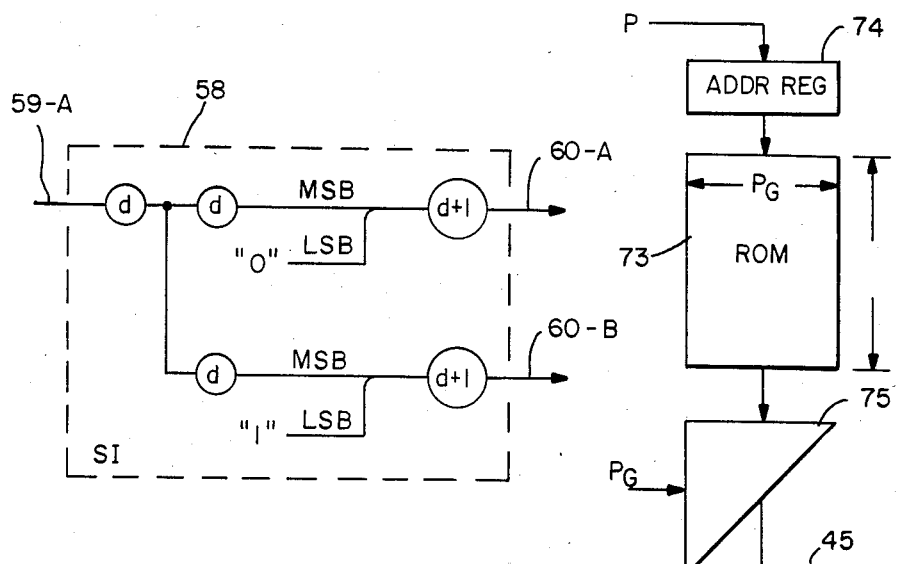
FIG.-5
FIG.-6

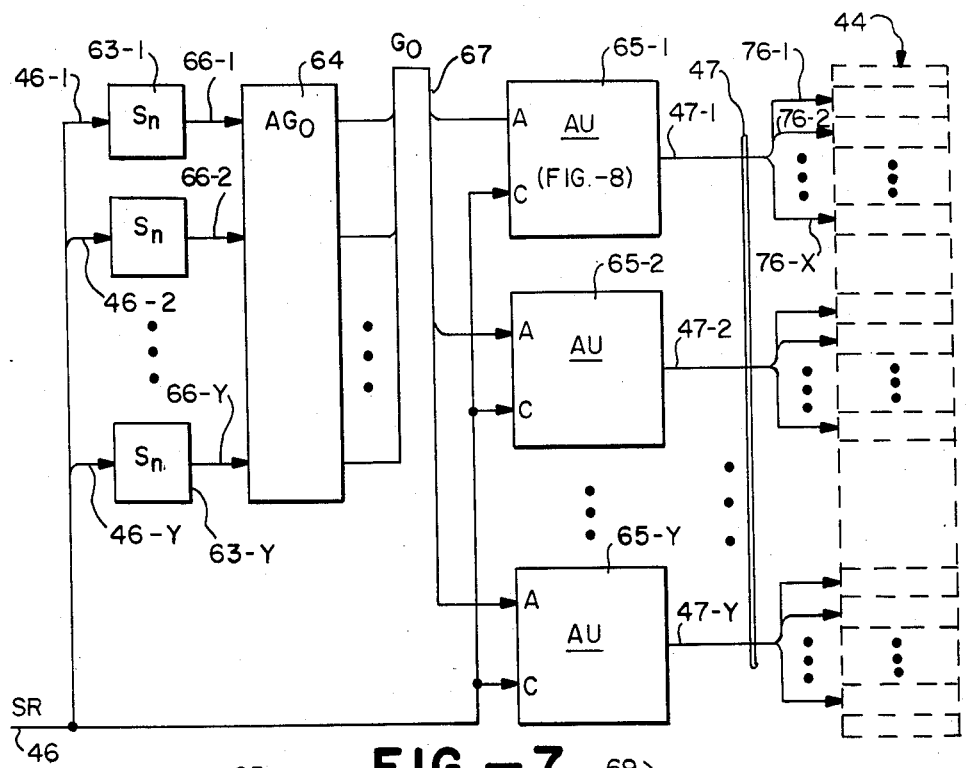
FIG.-7
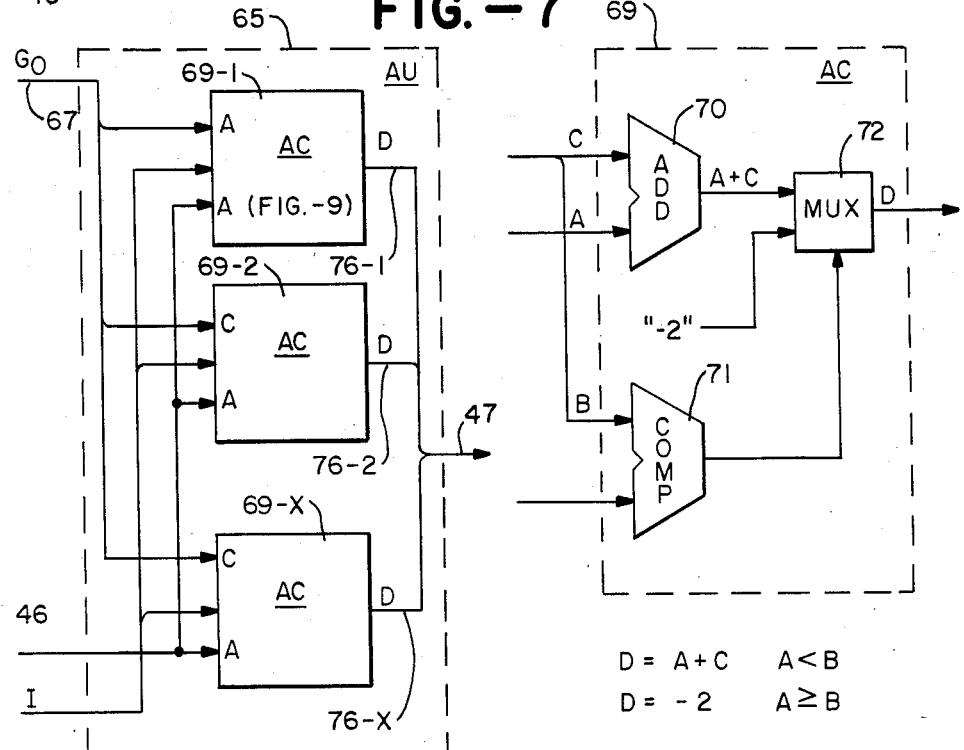
FIG.-8
$D = A+C \quad A<B$
$D = -2 \quad A \geq B$
FIG.-9

DIGIT-REVERSAL METHOD AND APPARATUS FOR COMPUTER TRANSFORMS

The work from which this application resulted was supported by the Defence Advanced Research Projects Agency under contract No. N00014-84-K-0103 with the U.S. Office of Naval Research.

CROSS-REFERENCED TO RELATED APPLICATION

COMPUTER AND METHOD FOR THE DISCRETE BRACEWELL TRANSFORM
Inventor: Ronald N. Bracewell
Ser. No. 590,885 Filed: Mar. 19, 1984, now U.S. Pat. No. 4,646,256, Registration Date Feb. 24, 1987
Assignee: The Board of Trustees of the Leland Stanford Junior University A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

This invention relates generally to the field of digital data processing apparatus and more specifically to a digit-reversal computer and method useful in performing fast discrete transforms on input data.

Transforms, such as the Fourier transform, have been well known to mathematicians, scientists, engineers and others for many years. These transforms are tools used in many fields such as medicine, economics, and engineering to analyze data. For example, when the input data represents time-varying electrical signals, the Fourier transform is often performed to identify the frequency components within the electrical signals. Similarly, an inverse Fourier transform is often performed to produce a time-varying electrical signal from frequency components. At times, data may be processed by first performing the Fourier transform, modifying the frequency components in a desired way, and inverting the transform.

For general background information relating to transforms, reference is made to the book *"The Fourier Transform and its Applications"* McGraw-Hill, Inc., 2nd Ed. 1978 by Ronald N. Bracewell.

In digital data processing apparatus, the Fourier transform is normally performed with discrete values of input data in accordance with the well-known discrete Fourier transform (DFT). The number N of values of input data may vary, but the larger the value of N the greater the resolution of the output data. In order to practically and efficiently perform N-length DFT's, digital computers are utilized. Even using digital computers, however, performance of N-length DFT's for large N is still a formidable task. For this reason, many prior art techniques have been developed to more efficiently perform the N-length discrete Fourier transform.

One significant technique for improving the efficiency of performing the discrete Fourier transform is described in the article by J. W. Cooley and J. W. Tukey, "An Algorithm for the Machine Calculation of Complex Fourier Series", *Math of Computation*, Vol. 19, pp. 297-301, April 1965. When the Cooley-Tukey algorithm was utilized on a general purpose computer, a more than fifty times improvement in processing time occurred for 1024-point DFT. The algorithm became known as the Cooley-Tukey fast Fourier transform (FFT). Many other Fourier transform algorithms such as the Sande-Tukey FFT have been proposed for more efficiently performing the N-length DFT.

In addition to Fourier transforms, other transforms have proved to be useful. For example, the Discrete Bracewell Transform (DBT) sometimes called the Discrete Hartley Transform (DHT) had led to the Fast Bracewell (Hartley) Transform, FBT or FHT, described in the above-identified cross-referenced application and in the article by R. N. Bracewell, "The Fast Hartley Transform," Proc. IEEE, vol. 72, pp. 1010-1018, August 1984.

The FFT, FBT (FHT) "fast" transforms are typically radix-2 transforms but more generally may be radix-B transforms where B is any positive integer greater than 1. Radix-B transforms rely on the property that a full N-length transform can be easily constructed from B transforms of length N/B. These fast transforms achieve speed by reiteratively decomposing the N-length transform into many elementary smaller transforms until it consists of transforms which are usually 1-length transforms. In many applications, these transforms are executed "in-place" so as to economize on the quantity of memory space used. For "in-place" execution, the same memory location (or "place") is used for data input, for data output, and for intermediate data computations. In such "in-place" FFT or FHT computers, the reordering required to counteract the effect of the transform decompositions is achieved by a particular permutation of the elements of the data sequence, which is described as follows.

In the radix-B fast transforms performed "in-place", an initial array represented as a sequence of elements X(i) indexed by i, where i ranges from 0 to N−1, is permuted to form a reordered array represented as a sequence of elements X(j) indexed by j where j ranges from 0 to N−1. The transform is achieved when certain of the elements X(i) having index i are swapped resulting in the elements X(j) having index j. The transform (permutation, conversion, reordering) is called digit-reversing, because if i is the index represented as a string of digits, base B, then j is that index having a representation that is the same string of digits written in reverse order, where N is a power of B and B is greater than or equal to 2.

The transform is a fast radix-B transform of N elements where B is greater than or equal to 2 and where N equals $B^P$ for some integral power P. Under these conditions, the permutation required for a fast transform is the "digit-reversing" permutation implemented when certain elements of X(i) are swapped resulting in X(j) where j is the "digit-reversing" of i (and vice versa). The digit-reverse of i can be found by writing i as a base-B number with P digits, adding zeroes to the front of the representation of i in base B if necessary, and reversing the order of the digits of i to obtain j. Since the highest index, N−1, is $B^P-1$, all of the indices can be written in P base-B digits. Thus i can be written as a string of digits as follows:

$$i = (b_P b_{P-1} \ldots b_k \ldots b_2 b_1)_B \qquad \text{Eq.(A)}$$

where the $b_k$ are base-B digits and k has values P, P−1, ..., 2, 1. Then j, the digit-reverse of i, is the base B number obtained by writing the string of numbers of i in reverse as follows:

$$j = (b_1 b_2 \ldots b_k \ldots b_{P-1} b_P)_B. \qquad \text{Eq.(B)}$$

where the $b_k$ are base-B digits and k has values 1, 2, ..., k, P−1, P.

An example of the digit reversal of i and j for base B=2 of Eq.(A) and Eq.(B) is shown in the following TABLE A. Note that since N=8 and B=2 in the TABLE A example, P=3 and so the base 2 representations of i and j have P=3 digits. For example, for $i_{10}$ equal to 3, $i_2$ equals $(011)_2$ where $b_3=0$, $b_2=1$ and $b=1$. The digit reverse of $i_{10}$ equal to $3_{10}$ corresponding to $i_2$ equal $(011)_2$ is $j_2$ equal to $(110)_2$ where $b_1=1$, $b_2=1$, and $b_3=0$ and corresponding to $j_{10}$ equal to $b_{10}$. For each of the eight values of $i_2$ and $j_2$ in TABLE A, $j_2=(b_1 b_2 b_3)$ and $j_2$ is the digit reverse of $i_2=(b_3 b_2 b_1)$.

TABLE A

| $i_{10}$ | $i_2$ | $j_{10}$ | $j_2$ |
|---|---|---|---|
| 0 | 000 | 0 | 000 |
| 1 | 001 | 4 | 100 |
| 2 | 010 | 2 | 010 |
| 3 | 011 | 6 | 110 |
| 4 | 100 | 1 | 001 |
| 5 | 101 | 5 | 101 |
| 6 | 110 | 3 | 011 |
| 7 | 111 | 7 | 111 |

In TABLE A, the columns $i_{10}$ and $j_{10}$ depict the i and j indicies in base-10 numbers while the columns $i_2$ and $j_2$ depict the indicies in corresponding base-2 numbers.

One example of the "in-place" permutation for a fast transform appears in the above-identified cross-referenced Bracewell application. In that application, the Discrete Bracewell Transform is arrived at by means of a Fast Bracewell Transform (FBT) which proceeds using a plurality of stages. The first stage ("zero" stage) receives an input sequence of N input data values, $F_{0,K}$, which are given for index values of k from 0 to N−1 as follows:

$$F_{0,K} = F_{0,0}, \ldots, F_{0,k}, \ldots, F_{0,(N-1)}.$$

The first stage of the FBT transform permutes the order of the input sequence using a bisecting permutation (or bit-reversing permutation), that is, a digit reversing permutation in which B=2. The bisecting permutation is carried out by sorting the original sequence of elements into odd-numbered and even-numbered elements thereby bisecting the original sequence into two segments, an odd segment and an even segment. The elements are then reordered with the odd-segment first followed by the even-segment. The new sequence in turn, has each segment odd-even bisected and reordered to form a new sequence. The odd-even bisecting and reordering is performed P−1 times for N-length data when N equals $2^P$. The bisecting permutation thus performed results in a sequence of N permuted data values, $F_{1,K}$, which are given for values of k from 0 to N−1 as follows:

$$F_{1,K} = F_{1,0}, \ldots, F_{1,k}, \ldots, F_{1,(N-1)}.$$

The permutation operation described functions to receive the N data values $F_{0,K}$ and reorder them as the N data values $F_{1,K}$. The sequence of the index k for the data values $F_{0,K}$ is denominated as i so that the elements $F_{0,k}$ correspond to the elements X(i). The reordered sequence of the index k for the data values $F_{1,K}$ is denominated j where j is the base-2 digit reversal of i as explained with reference to Eq.(A) and Eq.(B) so that the elements $F_{1,k}$ corresponding to the elements X(j).

An N equal to 16 example of the digit reversal permutation appears in the following TABLE B where the indicies of F are shown as base-10 numbers:

TABLE B

| k=i<br>$F_{1,k}$ | | k=j<br>$F_{0,k}$ |
|---|---|---|
| $F_{1,0}$ | = | $F_{0,0}$ |
| $F_{1,1}$ | = | $F_{0,8}$ |
| $F_{1,2}$ | = | $F_{0,4}$ |
| $F_{1,3}$ | = | $F_{0,12}$ |
| $F_{1,4}$ | = | $F_{0,2}$ |
| $F_{1,5}$ | = | $F_{0,10}$ |
| $F_{1,6}$ | = | $F_{0,6}$ |
| $F_{1,7}$ | = | $F_{0,14}$ |
| $F_{1,8}$ | = | $F_{0,1}$ |
| $F_{1,9}$ | = | $F_{0,9}$ |
| $F_{1,10}$ | = | $F_{0,5}$ |
| $F_{1,11}$ | = | $F_{0,13}$ |
| $F_{1,12}$ | = | $F_{0,3}$ |
| $F_{1,13}$ | = | $F_{0,11}$ |
| $F_{1,14}$ | = | $F_{0,7}$ |
| $F_{1,15}$ | = | $F_{0,15}$ |

Other FFT permutation algorithms are described by E. O. Brigham, "The Fast Fourier Transform", Englewood Cliffs, N.J., Prentice-Hall, 1974, Chap. 10, 11, pp. 148–197. Brigham considers all of the indices i, except the first and last, digit-reversing them, and if j is greater than i, then the array elements are interchanged. In, for example, the B=2 case, the bit-reversing is done by peeling each bit (a "bit" is a binary digit) off one end of the binary representation of i and reassembling the bits in the reverse order to form the binary representation of j. This method has complexity of order $O(N \log_2 N)$. More advanced permutation algorithms take advantage of some of the regularity in the i versus j relationship to form the bit-reversed indices by a small series of additions of powers of two. At least one and as many as $\log_2 N$ additions are required to calculate each j. Also, such algorithms still digit-reverse all of the indices i from 0 to N−1, and only make a change to the F array if j is greater than i. Since j is greater than i for only a little fewer than N/2 of the N values of i, calculating j for all i is clearly a major source of inefficiency in this method.

The efficiency of permutation algorithms is measured in terms of both execution times and number of arithmetic operations. The fastest algorithm known apart from the present invention, is implemented in the Pascal procedure shown in the following TABLE C. Note that "powersof2" is an array containing the powers of 2, for example, powersof2[1]=2, powersof2[2]=4.

TABLE C

```
begin
  j := −1;
  for i := 0 to N-3 do begin
    powersof2index := P;
    repeat
      powersof2index := powersof2index - 1:
      j := j - powersof2 [powersof2index]
    until j < -1;
    j := j + powersof2 [powersof2index];
    if j > 1 then Swap(i + 1, j + 1)
  end { for }
end;
```

TABLE C is the B=2 bit-reversing Buneman algorithm found in the paper by O. Buneman, "Two Hartley Transforms for the Price of One FFT" submitted for publication to the *SIAM Journal on Scientific and Statistical Computing*.

While various permutation techniques such as those described above have been known, there is a need for improved and more efficient computers and methods for performing permutations for use in fast transforms.

SUMMARY OF THE INVENTION

The present invention is a computer method and apparatus for permuting data values in fast transforms. The permuter of the present invention recognizes patterns in the relationship between indicies i and j. Firstly, the permuter includes means to avoid calculating j when i equals j, as there is nothing achieved in swapping an element with itself, and avoids calculating j when j is less than i, which are the cases when elements i and j should not be interchanged because they have already been interchanged (assuming proceeding along the data sequence $X_i$ in the direction of ascending i). Secondly, the permuter includes means to calculate j from i in a single multiplication by a power of B or, alternatively, in a single addition.

If B=2 then the digit-reversing permutation of the present invention is a "perfect shuffle" or "bisecting permutation" and the digit-reversing is called "bit-reversing".

The present invention is an apparatus for the digit-reverse reordering of an N-valued initial sequence having elements $x_i$ in the order $x_0, x_1, \ldots x_i, x_{(N-1)}$ to form a recordered sequence having elements $s_j$, in the order $x_{,o}, x_1, \ldots, x_j, \ldots, x_{(N-1)}$ where i and j are indices formed of P base-B digits, $b_k$, as $i=(b_p b_{P-1}, \ldots, b_k, \ldots, b_2 b_1)$ where k has values P, P−1, ..., 2, 1 and $j=(b_1 b_2, \ldots, b_k, \ldots, b_{P-1} b_P)$ where k has values 1, 2, ..., P−1, P, where B is greater than or equal to 2, where N equals $B^P$, and where B and P are integers. The present invention includes a seed table or other means for providing seed values and includes a calculator for calculating the digit reversed pairs of indices i and j based upon the seed values.

In one embodiment, the present invention employs a "seed" table of digit-reversed numbers. However, the size of this table, in general, is not larger than $(BN)^{\frac{1}{2}}$. This seed table can be implemented as a series of constants, or can be calculated each time permutation is done. Forming the seed table is an operation of order $O[(N)^{\frac{1}{2}} \log_B (N)^{\frac{1}{2}}]$, whereas the fast transform is of complexity $O(N \log_B N)$, so as N grows, the proportion of time spent forming the seed table becomes negligible.

The present invention performs the "perfect shuffle" more efficiently, and, according to timing experiments, runs about eight times faster than the fastest other algorithm known. The present invention is of order O(N) and led, in one example, to a saving of 7% in the total (radix-2) FFT running time for N=1024.

In accordance with the above summary, the present invention provides an improved special-purpose computer and method of computation for performing N-length discrete transforms employing improved permutations.

Additional objects and features of the invention will appear from the following description in which the preferred embodiments of the invention have been set forth in detail in conjunction with the drawings.

BRIEF DESCRIPTION OF THE DRAWINGS

FIG. 3 depicts the permute control which forms part of the permuter within the computer of FIG. 2.

FIG. 5 depicts one stage of the shift/increment module which is employed in the seed table of FIG. 4.

FIG. 6 depicts an alternative seed table embodiment for the seed generator for the permute control of FIG. 3.

FIG. 7 depicts a block diagram of the permute generator which forms part of the permute control of FIG. 3.

FIG. 8 depicts one arithmetic unit module which is employed in the FIG. 7 permute generator.

FIG. 9 depicts an add-comparator module which forms part of the arithmetic unit module of FIG. 8.

DETAILED DESCRIPTION

Figure 1:
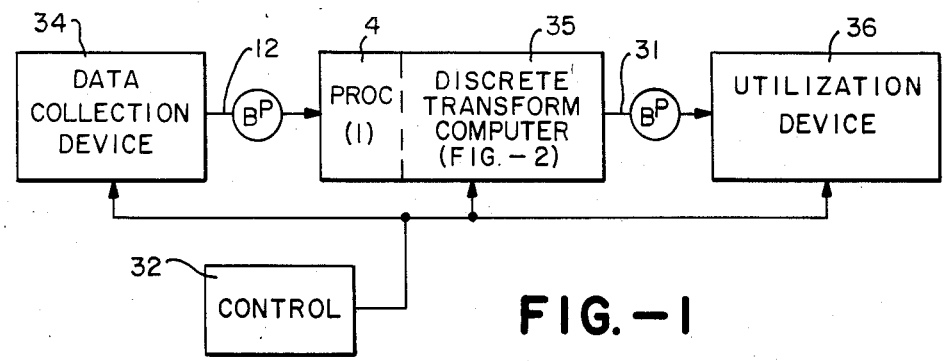
FIG. 1 is a block diagram of a system employing a discrete transform computer having an improved permuter.

Overall System—FIG. 1

In FIG. 1, a typical system utilizing a discrete transform computer 35 is shown. In the FIG. 1 system, the device 34 is, for example, a radar or other data collection device which provides N samples of data during each time frame. Control 32 provides clocking and framing signals in a conventional manner to clock and frame the input data samples. The N data samples, for each frame period, are input to the discrete transform computer 35. The discrete transform computer 35 transforms the input data samples and forms, on the output lines 31, the transformed values. The transformed values are provided as an input to the utilization device 36. Utilization device 36 receives the transformed values, one set of N values for each frame, and executes recognition calculations based upon the transformed values in order to determine the nature of the radar or other type signals provided by the data collection device 34. In this manner, the FIG. 1 apparatus provides a radar detection or other type apparatus which can operate in real time. Although a radar system has been by way of a particular example, any type of system utilizing a fast transform may be employed.

A further understanding of a particular discrete transform computer 35 can be obtained with reference to the Discrete Bracewell Transform described in the above-identified cross-referenced application.

Figure 2:
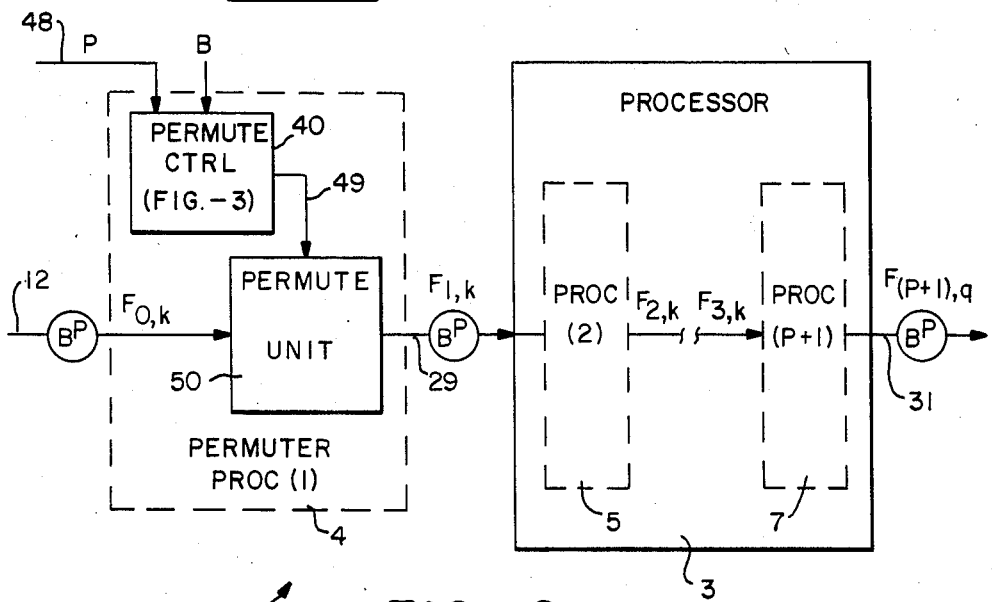
FIG. 2 depicts a block diagram of the discrete transform computer of FIG. 1.

Discrete Transform Computer—FIG. 2

In FIG. 2, the discrete transform computer 35 of FIG. 1 is shown for performing a fast transform. The computer receives an ordered finite set of real numbers on input lines 12. The ordered set includes N numbers where N is equal to $B^P$ and where P and B are positive integers. The input values of data on lines 12 are permuted in the permute processor 4 (PROC 1). The permute processor 4 permutes the input numbers on lines 12 using the improved permutation of the present invention.

The input sequence of numbers on lines 12 is denominated $F_{0,K}$ and the output sequence on lines 29 from the permute processor 4 is denominated $F_{1,K}$. In FIG. 2, a processor 3 receives the permuted sequence $F_{1,k}$ on lines 29 and provides the transformed output $F_{(P+1),K}$ on output lines 31.

In FIG. 2, the processor 3 typically includes the P processor stages PROC (2), ..., PROC (P+1). The PROC (2) stage 5, is the first stage and the PROC (P+1) stage 7 is the last stage. Each of the stages PROC (2), ..., PROC (P+1) processes an N-valued input sequence from the previous stage to form an N-valued output sequence. Each stage, s, for s equal to values from 2 to P+1 calculates N values of $F_{s,k}$ for k equal to values from 0 to N−1. Each value of $F_{s,k}$ for the s stage is calculated as a function of values from the previous s−1 stage. The N-valued transform output employing the improved permutation of the present invention appears on lines 31.

Theory of Permutation

To develop the theory behind the invention, additional notation is introduced, and then the theory is stated as three theorems together with their proofs.

The index i which indexes the elements of the N-element array F can be considered to consist of three parts when it is written as a P-digit number having digits b in base B. Specifically, let i be defined as follows:

$$i = (b_P b_{P-1} \ldots b_2 b_1)_B = (fme)_B, \quad \text{Eq. (1)}$$

where, $n = (N)^{\frac{1}{2}}$, if P is even $n = (N/B)^{\frac{1}{2}}$ if P is odd, f = the front $\log_B n$ digits of i m = the middle digit of i, if P is odd m = no digit at all, if P is even e = the end $\log_B n$ digits of i.

If P is even there is no "middle" digit m, and in digit-reversing i, all of the digits move somewhere else, and this even case is quite different from the case where P is odd and the middle digit remains in the same position. The definition of m in Eq. (1) is a notational device used to describe both of these fundamentally distinct odd and even cases simultaneously.

The concept of a "group" is now formally introduced. The i values, which range from 0 to N−1, can be partitioned into equal sized groups of contiguous i values. The size of each such group is n, and the zeroth group (the groups are labelled 0, 1, 2, ...) is for i=1, ...n−1, the first group is for i=n, ..., 2n−1, and so on. It follows from the definition of n that there are n groups if P is even and nB groups if P is odd. From Eq. (1) it can be seen that, in each group, f is the same, and provides the label or "groupnumber" for the group, and that e ranges through all of the possible values 0 to n−1 within each group. The labelling of the position, or "offset", of each member of the group goes from 0 to n−1, and is simply the number e.

Thus $i = (fme)_B$ is the $(e)_B$th member of the $(fm)_B$th group, and so has an offset of $(e)_B$ and a groupnumber of $(fm)_B$.

Given from Eq. (1) that $i = (fme)_B$, j is given as follows:

$$j = (b_1 b_2 \ldots b_{P-1} b_P)_B = R[i] = R[(fme)_B] = (R[e]mR[f])_B \quad \text{Eq.(2)}$$

where R[ ] is the digit-reversing function.

Finally, the seed table S is defined. The seed table consists of the digit-reversed sequence of length n if P is even as follows:

$$S[k] = R[(k)_B], \quad k = 0, \ldots, n-1 \quad \text{Eq. (3-1)}$$

where k is written with $\log_B n$ digits.

The seed table consists of the digit reversed sequence of length nB if P is odd as follows:

$$S[k] = R[(k)_B], \quad k = 0, \ldots, nB-1 \quad \text{Eq. (3-2)}$$

where k is written with $1 + \log_B n$ digits.

A summary of the notation is presented in TABLE 1 as follows.

TABLE 1

| NOTATION | MEANING |
|---|---|
| N | Number of elements (length) in the sequence to be transformed |
| B | Base or radix of the transform |
| P | N is B to the Power of P, $N = P^B$ |
| X[.] | Array holding the sequence; indexed 0 ... N-1 |
| i | Index of an array element |
| j | Digit-reverse of i (X[i] and X[j] to be swapped) |
| n | Number of (i,j) pairs per group |
| R[.] | Digit-reversing function (reverses order of digits) |
| S[.] | Seed table, |
| $(fme)_B$ | Front, middle and end of the base B representation of a number, f and e of equal length, m is at most 1 digit |
| $(\ldots)_B$ | Base B representation of a number |
| $(fm)_B$ | Groupnumber of $(fme)_B$ |
| $(e)_B$ | Offset of $(fme)_B$. |

The first theorem states how the digit-reversed indices for i in the first group can be calculated in a single multiplication. The second theorem states how all other digit-reversed indices can be calculated from the indices of the first group in a single addition. The third theorem states which digit-reversed indices need calculating and which (i,j) pairs need not be calculated by the permutation.

THEOREM 1: If $i = (fme)_B$ is in the zeroth group, that is, $(fm)_B = 0$, then $j = R[i] = n(S[i]) = n(S[(e)_B]) = n(S[\text{offset of } i])$.

Proof: If P is even, then $(fm)_B = (f)_B = 0$ and since $(f)_B$ has $\log_B n$ digits, $j = R[i] = (R[e]R[f])_B = ((R[e])_B)(B^{\log B^n}) = (n)(R[(e)_B])$. But $R[(e)_B]$ is S[i] by definition since $(fm)_B$ is zero and e has $\log_B n$ digits. Since $(fm)_B = 0$, it follows from the definition of S[i] that $(R[e])_B = S[(e)_B] = S[i]$ where $(e)_B$ is the offset of i.

If P is odd, then m=0 and $j = (R[e](0)R[f])_B = (n)(R[e]0)_B$. But $R[(0e)_B] = S[i] = S[(e)_B]$ by definition since $(0e)_B$ has $1 + \log_B n$ digits.

THEOREM 2: If $i_1 = (f_1 m_1 e)_B$ is in the zeroth group, that is, $(f_1 m_1)_B = 0$, and $i_2 = (f_2 m_2 e)_B$ is in the $(f_2 m_2)_B$th group, and both have the same offset, $(e)_B$, then $j_2 = j_1 + S[(f_2 m_2)_B]$, that is, $j_2 = j_1 + S[\text{groupnumber of } i_2]$.

Proof: Since $(f_1 m_1)_B = 0 = (R[f_1 m_1])_B$, then $j_2 = R[i_2] = (R[e]m_2 R[f_2])_B = (R[e]R[f_2 m_2])_B = (R[e]R[f_1 m_1] + R[f_2 m_2])_B = (R[e]m_1 R[f_1])_B + (R[f_2 m_2])_B = j_1 + R[(f_2 m_2)_B] = j_1 + S[(f_2 m_2)_B]$.

THEOREM 3: For $i = (fme)_B$, if $(fm)_B$ is greater than or equal to $S[(e)_B]$ then the digit-reversing permutation does not swap X[i] and X[j], that is, if the group number $(fm)_B$ of i is greater than or equal to $S[(e)_B] = S[\text{offset of}$ i], no swap is required. Otherwise when the groupnumber is less than S[offset], a swap is required.

Proof: The digit-reversing permutation can be achieved by swapping X[i] and X[j] if j is greater than i and j is the digit-reverse of i. (This avoids swapping a pair twice, which would achieve nothing, avoids swapping an X[i] with itself, and yet does all the swaps necessary for the permutation. Notice that if i is the digit-reverse of j, then j is the digit reverse of i.) Thus, given an i and its digit-reverse j, the theorem is proved if it can be shown that $(fm)_B$ is greater than or equal to $S[(e)_B]$ whenever i is greater than or equal to j.

Given $i=(fme)_B$ and $j=(R[e]mR[f])_B$ so that i greater than or equal to j implies $(fme)_B$ greater than or equal to $(R[e]mR[f])_B$ and implies $(fm)_B$ greater than $(R[e]m)_B$, or, $(fm)_B=(R[e]m)_B$ and $(e)_B$ greater than or equal to $(R[f])_B$. But cancelling the effect of m and applying the digit-reversing function to the condition $(fm)_B=(R[e]m)_B$ gives $(R[f])_B=(R[R[e]])_B=(e)_B$ which are the conditions for i=j. Hence i greater than or equal to j implies $(fm)_B$ greater than or equal to $(R[e]m)_B$.

Now if P is even, then m is no digit at all and the equality $(R[e])_B=S[(e)_B]$ follows from the definition of S, so i greater than or equal to j implies $(fm)_B$ greater than or equal to $S[(e)_B]$ as required.

If P is odd, then because m is a single base-B digit, $(R[e]m)_B$ is greater than or equal to $(R[e]0)_B=(R[0e])_B=S[(0e)_B]=S[(e)_B]$ so that i greater than or equal to j implies that $(fm)_B$ is greater than or equal to $(R[e]m)_B$ greater than or equal to $S[(e)_B]$ as required.

COROLLARY: If$(e)_B=0$, that is, the offset of i is zero, then no swap is required. The proof follows from theorem 3 and the fact that S[0]=0.

Application of Theorems

The present invention applies the above theorems for all values of i, avoiding calculating any j unnecessarily, calculating j in a single multiplication or addition, and swapping X[i] and X[j] as required. Since the (i,j) pairs for i in groups other than the zeroth are calculated from the (i,j) pair in the zeroth group with the same offset, it is economical to step through the i values for each offset, doing the zeroth group calculation of j first. Then theorem 3 and the seed table indicate how many groups, for that offset, require a swap of X[i] and X[j]. Note that always the seed[offset] lowest groups, and no others, require calculation of j (and, of course, swapping), which is very convenient. This procedure must be repeated for all offsets, except an offset of zero (see the corollary).

The present invention may be implemented in a computer using a computer program. One example of a program, written in Pascal, is shown in TABLE 2. In that program, the invention is implemented in the Permute procedure. This permute procedure in turn calls the procedure Swap to swap two array elements once a suitable (i,j) pair has been found, and calls the procedure CreateSeedTable to set up the appropriate seed table. The main body of the TestPermute program prompts the user for a base B and a power P, initializes an array X, and from the results deduces a complete list of i from 0 to N−1 and their digit-reverses, j.

TABLE 2

COPYRIGHT 1986 The Board of Trustees of the Leland Stanford Junior University

```
programTestPermute(input,output);
type DataArray=array[0.65535]of real;
var X:DataArray; P,B,m:integer;
procedure Permute(varX:DataArray;P,B:integer);
var powersOfB:array[0.16]of integer; {big enough for P up to 16}
    seed:array[0.255]of integer; {big enough for B=2,P=16}
    logB_n, logB_SeedSize,i,j,k,firstj,offset,groupNumber,n:integer;
procedure CreateSeedTable;
  begin for k:=0 to B−1 do seed[k]:=k;
    for logB_SeedSize:=2 to logB_n do
      for i:=0 to powersOfB[logB_SeedSize−1]−1 do begin
        seed[i]:=B*seed[i];
        for k:=1 to B−1 do
          seed[i+k*powersOfB[logB_SeedSize−1]]:=seed[i]+k
  end {for,for,for} end {CreateSeedTable};
procedure Swap(i,j:integer);
  var temp:real; begin temp:=X[i];X[i]:=X[j];X[j]:=temp end;
begin {Permute}
  powersOfB[0]:=1;for k:=1 to P do powersOfB[k]:=B*powersOfB[k−1];
  logB_n:=P div 2; n:=powersOfB[logB_n];
  if P mod 2=1 then logB_n:=logB_n+1; {for odd P}
  CreateSeedTable;
  for offset:=1 to n−1 do begin
    firstj:=n*seed[offset];i:=offset;j:=firstj; {zeroeth group}
    Swap(i,j);
    for groupNumber:=1 to seed[offset]−1 do begin {other groups}
      i:=i+n; j:=first;+seed[groupNumber];
      Swap(i,j)
end{for,groupNumber}end{for,offset}end{Permute};
begin{TestPermute}
  for m:=0 to 65535 do X[m]:=m;
  writein(Enter base B,<cr>,power P,<cr>.);read(B,P);
  Permute(X,P,B);
  writein(ForB=;B:2;and P=;P:2; digit−reversing gives:);
  writein(i j);
  for m:=0 to round(exp(P*in(B)))−1 do writein(m:9; ;round(X[m]):7)
  end.
```

The names of the variables in TABLE 2 have been chosen to correlate with the notation used in the text, and other names have obvious meanings, for example, $logB\_$ n means $log_B$ n.

One further point is the generation of the seed table. This order $O((N)^{\frac{1}{2}}\log_B (N)^{\frac{1}{2}})$ implementation of the seed table uses the recurve relationship as follows:

$S_{BL}[k] = (BS_L[k \bmod B]$   0 is less than or equal to   Eqs. (4)
$k$ is less than or equal to $(L - 1)$ $S_{BL}[k] = (BS_L[k \bmod B] + 1$   $L$ is less than or equal to
$k$ is less than or equal to $(2L - 1)$ $S_{BL}[k] =$
.
.
.

$S_{BL}[k] = (BS_L[k \bmod B] +$   $(B - 1)L$ is less than or equal to
$B - 1$   $k$ is less than or equal to $BL - 1$ where $S_L$ denotes a seed table of length L. This recursive relationship of Eqs. (4) is a simple and quick method of generation and is useful for generating sequences of digit-reversed numbers in hand calculations. In the TABLE 2 program, the digit-reversed sequence of length B, which is simply the same sequence, is used to start the recursion. Eqs. (4) come from the fact that if $S_L[(k)_B] = (R[k])_B$ then, $S_{BL}[(dk)_B] = (R[dk])_B = (R[k]d)_B = (B)(R[k])_B + d = (B)S_L[k] + d,$ where k is written as a base B number with $\log_B L$ digits and d is a single base B digit. Note that $(dk)_B$ has $1 + \log_B L$ digits and ranges from 0 to $BL - 1$.

Note that all of the multiplications in the algorithm are by powers of B. If B is a power of 2 then these multiplications become logical left shifts in digital computer implementations and the algorithm need contain no time-consuming multiplications.

Example with N=16

Consider the case of N=16 for a radix-2 transform. The (i,j) pairs obtained by bit-reversing in this case are those shown in the following TABLE 3.

TABLE 3

| PERMUTATION EXAMPLE B = 2, N = 16 | | | | | |
|---|---|---|---|---|---|
| $i_2$ | $i_{10}$ | $j_{10}$ | $j_2$ | Swap (order) | Group No. |
| 0000 | 0 | 0 | 0000 | No | $0^{th}$ |
| 0001 | 1 | 8 | 1000 | Yes(1) | |
| 0010 | 2 | 4 | 0100 | Yes(3) | |
| 0011 | 3 | 12 | 1100 | Yes(4) | |
| 0100 | 4 | 2 | 0010 | No | $1^{st}$ |
| 0101 | 5 | 10 | 1010 | Yes(2) | |
| 0110 | 6 | 6 | 0110 | No | |
| 0111 | 7 | 14 | 1110 | Yes(5) | |
| 1000 | 8 | 1 | 0001 | No | $2^{nd}$ |
| 1001 | 9 | 9 | 1001 | No | |
| 1010 | 10 | 5 | 0101 | No | |
| 1011 | 11 | 13 | 1101 | Yes(6) | |
| 1100 | 12 | 3 | 0011 | No | $3^{rd}$ |
| 1101 | 13 | 11 | 1011 | No | |
| 1110 | 14 | 7 | 0111 | No | |
| 1111 | 15 | 15 | 1111 | No | |

TABLE 3 has the same permutation as TABLE B. In TABLE 3, only six of the i values require swaps (yes). To determine which six (i,j) pairs are swapped depends on whether the i values are examined in ascending or descending order. In either case, the end result is the same. The horizontal lines divide TABLE 3 into four groups, and, going in the direction of ascending i, there is one less swap required for each subsequent group then for the previous group. Also, the first element of each group never needs swapping, the second is swapped in the first two groups, the third in the first group, and the fourth in the first three groups. Finally, in TABLE 3 and j indices in the first group are just four times the bit-reversed sequence of length four, namely the sequence 0,2,1,3. The second, third and fourth groups are merely the first group +2, +1, and +3 for each value, respectively. Such relationships hold generally.

These observations about TABLE 3 illustrate the utility of a "seed" table of digit-reversed numbers. However the size of this seed table need not be larger than $(BN)^{\frac{1}{2}}$. This seed table can be loaded as a series of constants for example from a read-only memory (ROM), or can be calculated each time the permutation is done. Forming the seed table is an operation of order $O((N)^{\frac{1}{2}}(\log_B N)^{\frac{1}{2}})$, whereas the fast transform is of complexity $O(N \log_B N)$. Therefore, as N grows, the proportion of time spent forming the seed table becomes smaller and eventually negligible for large N.

Performance of Invention

The present invention is clearly more efficient than Buneman's algorithm of TABLE C as the present invention calculates less than half of the number of digit-reversed indices, does not need to test the calculated j against the given i, and calculates each j with just one arithmetic operation. However, the present invention has an overhead that the other algorithms do not, namely, the setting up of the seed table. This overhead can be made aribtrarily small by storing digit-reversed sequences of sufficient length as constants.

It is interesting to count the number of operations a computer has to perform to execute each permutation. In Buneman's algorithm the outer "for i" loop is executed $N-2$ times, the inner "repeat" loop is executed $2N-P-3$ times, and $(N/2)(1-1/n)$ swaps are made. As N becomes large these factors become N, 2N and N/2 respectively. In the present invention, in the B=2 case, the outer "for offset" loop is executed $n-1$ times, the inner "for group Number" loop is executed $(N/2)(1-1/n)-(n-1)$ times, and $(N/2)(1-1/n)$ swaps are made. As N becomes large these factors become $(N)^{\frac{1}{2}}$ if P even or $(N/B)^{\frac{1}{2}}$ if P is odd, N/2 and N/2 respectively. TABLE 4 shows how many operations each algorithm requires as N becomes large, assuming P is even and ignoring any operations used to form the seed table, which is a procedure of order $O((N)^{\frac{1}{2}}(\log_B N)^{\frac{1}{2}})$, or can be avoided altogether.

TABLE 4

| ALGORITHM OPERATION COUNT FOR B = 2 CASE, LARGE N.* | | |
|---|---|---|
| Computer Operation | (Buneman)TABLE C | TABLE 2 |
| Array swaps X[i]with:X[j] | N/2 | N/2 |
| Increments | 3 N | $N/2 + (N)^{\frac{1}{2}}$ |
| Additions | 3 N | N |
| Multiplication/Shift | — | $(N)^{\frac{1}{2}}$ |
| Comparisons (tests) | 4 N | $N/2 + (N)^{\frac{1}{2}}$ |
| Branches | 3.5 N | $N/2 + (N)^{\frac{1}{2}}$ |
| Assignments (only) | N | $2(N)^{\frac{1}{2}}$ |
| Table accesses | 3 N | $N/2 + 2(N)^{\frac{1}{2}}$ |

*P is assumed to be even. If P is odd, replace all occurrences of $(N)^{\frac{1}{2}}$ with $(N/B)^{\frac{1}{2}}$.

Since the digit-reversal permutation problem requires $(N/2)(1-1/n)$ swaps it has a minimum order of $O(N)$. Both the present invention and Buneman's algorithm of TABLE C are of order $O(N)$, but TABLE 4 indicates that the present invention is clearly faster by a constant factor. This factor will be implementation dependent, but is substantial.

Figure 11:
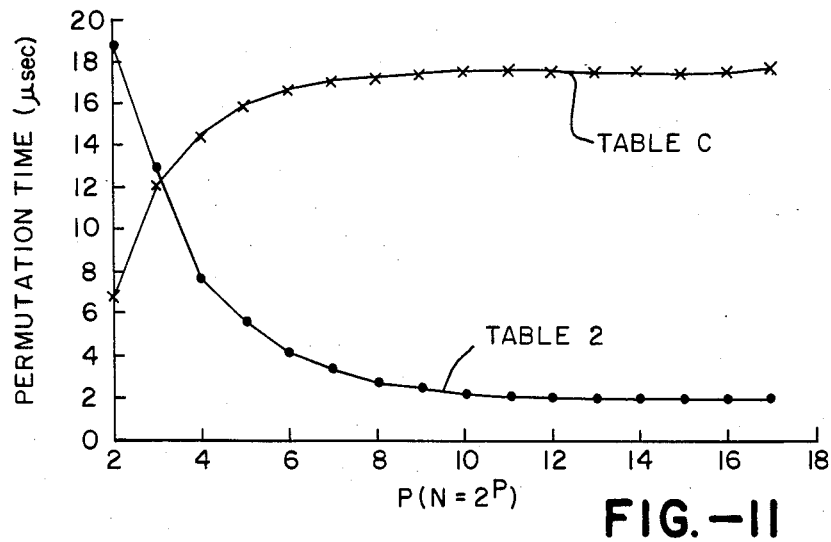
FIG. 11 depicts a graph depicting the performance of the present invention compared with the performance of the TABLE C permutation program.

Timing experiments comparing Buneman and the present invention were made on a VAX 11/782 computer running under VMS using the programs of TABLE C and TABLE 2, but rewritten expressly for the B=2 case (that is, replacing "B" with "2" in the code). The programs are written in Pascal, so the multiplication by a power of 2 was executed as an expensive integer multiplication rather than implemented as a cheaper shift. The swapping operations were deleted from both algorithms, replacing the "j is greater than i" test with "j is greater than N" in TABLE 2 of the present invention. This modification allows comparison of just the time spent in actually calculating the array indices for swapping, rather than including the time spent in swapping array elements. The results of the tests are shown in FIG. 11, which is a graph of the time in microseconds taken to compute the array indices of the elements requiring swapping, normalized by dividing by N, against P=log$_2$ N, the size of the transform. FIG. 11 compares the present invention (marked with circles) with Buneman's algorithm of TABLE C (marked with squares). The present invention has the lower asymptote and Buneman's has the higher asymptote.

In the present invention, the overhead of producing the seed table was significant for N less than about 1000, but this problem can be reduced by not requiring the seed table to be built completely from scratch. As N becomes large, and once the effect of the overhead becomes insignificant, the present invention takes less than one eighth of the execution time of Buneman's TABLE C in calculating the indices of the array elements that need swapping. The present invention is half an order of magnitude and a large constant factor faster than actually reversing the bits of the indices.

Effect of Permutation on Total Transform Time

Further timing experiments indicate that computing the indices of the array elements to be swapped with Buneman's TABLE C, takes up a significant proportion of total FFT running time. With a radix-2, decimation in time FFT using pre-permutation, the permutation required the following proportions of total FFT execution time, 8.3% for N=1024, 5.3% for N=8192, and 3.1% for N=32,768. Therefore, the savings that would be made by using the present invention are significant, being in the vicinity of 7% for N=1024, 4.5% for N=1024 or 2.5% for N=32,768, for the FFT.

The total (FHT) running time is only about 60%-70% of FFT running time for real input data, but the FBT(FHT) requires the same digit-reversing permutation as the FFT, and so the effect of using the present invention is even more advantageous and dramatic in the Fast Bracewell Transform (FBT).

An FFT or FBT algorithm is of order 0(N log$_2$ N), so the impact of the more efficient permutation of the present invention diminishes as N increases.

Permute Processor—FIG. 2

In FIG. 2, the permute processor 4 includes a permute unit 50 and a permute control 40. The permute unit 50, in one embodiment, is like the permute unit 50 in the above-identified cross-referenced application. In that application, the permute unit 50 typically was a cross-point switch in which the B$^P$ inputs, F$_{0,k}$ were reordered in accordance with the digit-reversing permutation to form the B$^P$ outputs, F$_{1,k}$.

In FIG. 2, the permute control 40 controls the permute unit 50 in order that the crossing of the inputs and outputs occurs as desired.

Permute Control—FIG. 3

In FIG. 3, the permute control 40 of FIG. 2 is shown in further detail. The permute control includes a seed generator 41. Seed generator 41 receives the input value of P on lines 48. Seed generator 41 generates outputs on lines 45 which feed the seed register 42. The contents of the seed register 42 are the seed table as previously described.

The seed register 42 on output lines 46 provides the seed table output to the permute generator 43. The permute generator 43 in turn is used to load the permute register 44. The output from the permute register 44 on lines 49 controls the permute unit 50 of FIG. 2.

Figure 4:
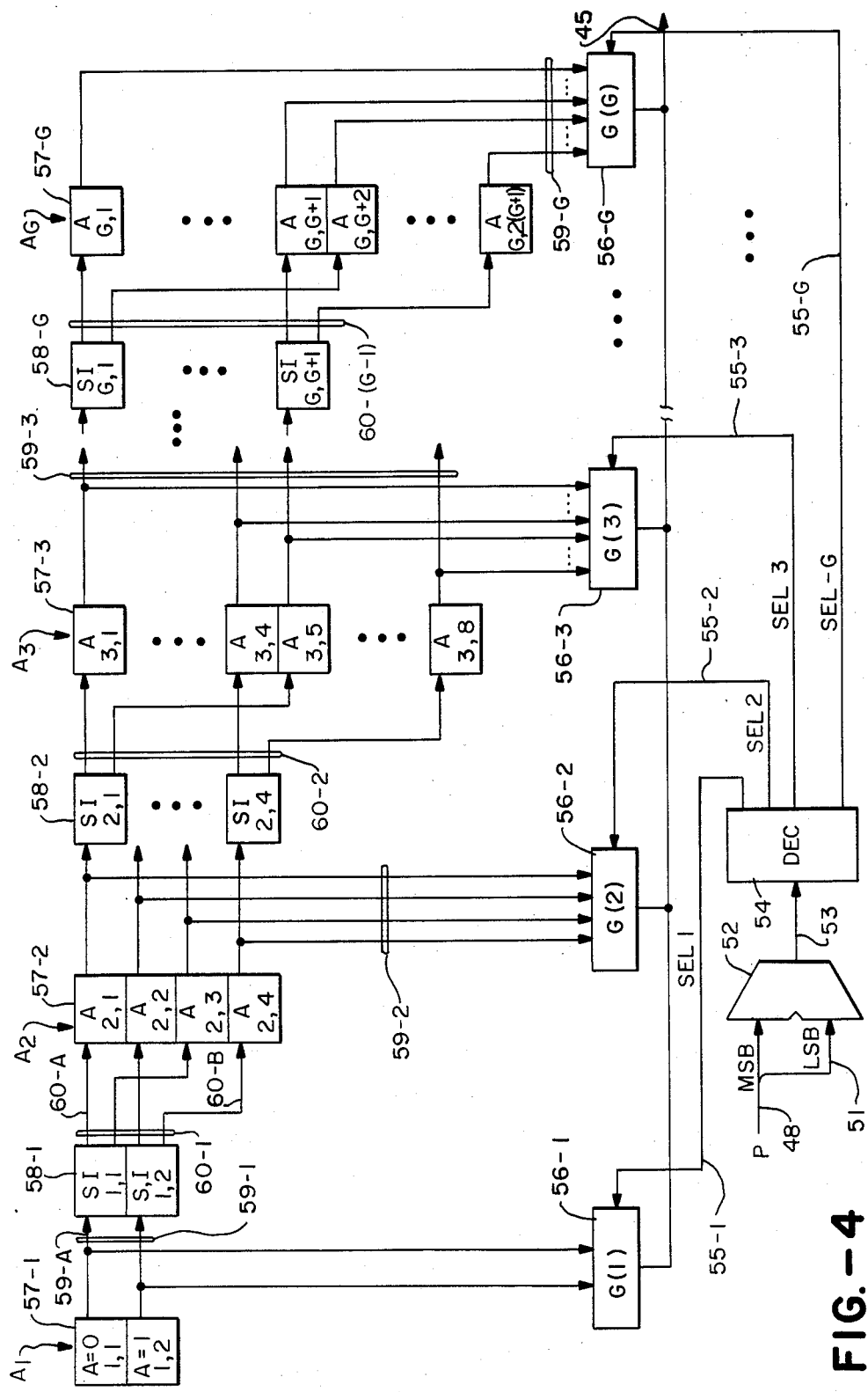
FIG. 4 depicts a seed generator which forms part of the permute control of FIG. 3.

Seed Generator—FIG. 4

In FIG. 4, further details of one embodiment of the seed generator 41 within the permute control 40 of FIG. 3 are shown. In FIG. 4, the seed generator 41 includes a series of arrays $A_1, A_2, A_3, \ldots, A_G$ where G has a value equal to the maximum value of P, $P_{max}$, divided by 2. Each array after the array $A_1$ is twice the size of the previous array, that is $A_2$ is twice $A_1$, and $A_3$ is twice $A_2$ and so on.

In FIG. 4, the array $A_1$ includes the array elements $A_{1,1}$ and $A_{1,2}$. The $A_2$ array 57-2 includes the elements $A_{2,1}, A_{2,2}, A_{2,3},$ and $A_{2,4}$. Similarly, the $A_3$ array 57-3 includes the elements $A_{3,1}, \ldots, A_{3,4}, A_{3,5}, \ldots, A_{3,8}$. Finally the $A_G$ array 57-G includes the elements $A_{G,1}, \ldots, A_{G,G}, A_{G,G+1}, \ldots, A_{G,2G}$.

Each of the arrays 57-1 through 57-G is formed of the elements which have binary values of a logical one or a logical 0. Each of the array elements can be a register stage, a signal propagating gate, or a connector which merely connects the logical state from the input to the output. The determination of whether or not the array elements are register stages for latching the data will be determined by the propagation delay from array $A_1$ to array $A_G$. If G is greater then the propagation capabilities of the circuitry of FIG. 4, then one or more of the arrays $A_1$ through $A_G$ will require a register stage which stores the value of the array.

In FIG. 4, the outputs from each array element are input to a shifter/incrementer module 58. Specifically, the element $A_{1,1}$ feeds its output to the module $SI_{1,1}$ and the element $A_{1,2}$ feeds its output to the module $SI_{1,2}$. Each of the SI modules forms two outputs. The first output is the input multiplied by two and the second output is the input multiplied by two and incremented by one. Specifically, referring to the $SI_{1,1}$ module 58-1, the input 59-A is multiplied by two to form the output 60-A and is multiplied by two and incremented by one to form the output 60-B.

The output from the $SI_{1,1}$ module has the multiplied by two outputs 60-A connected as the input to the $A_{2,1}$ element of the $A_2$ array and has the multiplied by two and increment by one output 60-B connected as the input to the $A_{2,3}$ element.

Because each SI module takes one input and produces two outputs, each subsequent array is twice as large as the previous array.

In FIG. 4, the $SI_{1,2}$ module receives the output from the $A_{1,2}$ element and produces the two outputs which connect to the $A_{2,2}$ and $A_{2,4}$ elements of the $A_2$ array.

The outputs from the $A_2$ array including the elements $A_{2,1}, \ldots, A_{2,4}$, connect as inputs to the modules $SI_{2,1}, \ldots, SI_{2,4}$, respectively.

The modules $SI_{2,1}$ through $SI_{2,4}$ in turn each provide two outputs which connect as inputs to the $A_3$ elements $A_{3,1}, \ldots, A_{3,4}, A_{3,5}, \ldots, A_{3,8}$.

In the manner described, additional modules SI and arrays A intermediately are connected in the manner described until the final set of modules 58-G is obtained. The modules $SI_{G,1}, \ldots, SI_{G,G+1}$ have the outputs 60-(G−1).

The outputs 60-(G−1) connect as inputs to the $A_G$ array elements 57-G which include elements $A_{G,1}, \ldots, A_{G,G+1}, A_{G,G+2}, \ldots, A_{G,2G+1}$ which in turn provide the outputs 59-G.

In FIG. 4, the outputs from each of the arrays $A_1$, $A_2$, $A_3$, ..., $A_G$ are denominated as 59-1, 59-2, 59-3, ..., 59-G which in turn are selectable by the gates 56-1, 56-2, 56-3, ..., 56-G, respectively. Each of the gates 56-1 through 56-G and identified as G(1), G(2), G(3), ..., G(G), respectively, connect, when selected, the corresponding array outputs to the output lines 45. The particular one of the gates 56-1 through 56-G selected at any one time is determined by one of the selection signals SEL-1 through SEL-G, respectively, on lines 55-1 through 55-G, respectively, from the decoder 54. For example, when the SEL-3 signal on line 55-3 is asserted, the G(3) gate 56-3 is enabled to provide the outputs 59-3 onto the lines 45. The particular one of the outputs from decoder 54 which is asserted is determined as a function of the number P. When P is an even number (the least significant bit, LSB, is 0) P is divided by two and input into the decoder 54. When P is an odd number, (LSB is a 1) then P is incremented by 1 and the result divided by 2 and input to the decoder 54.

In FIG. 4, P is input as a binary number on lines 48 including a single least significant bit (LSB) on line 51, and including the remaining most significant bits (MSB). If LSB is a 1, indicating an odd number, then 1 is added by adder 52 to the MSB higher order bit inputs. The output on lines 53 from the adder 52 has effectively discarded the least significant bit of P. More specifically, if P is odd with LSB a 0, then the output on lines 53 is the higher order MSB bits without the LSB bit. Effectively, the output on lines 53 has been right-shifted by one bit effecting a division by 2. In the case where LSB of P is 1, the 1, which is the equivalent of the carry-out to the MSB bits is added to MSB and again the output on lines 53 is effectively right-shifted one bit to effect the division by 2.

SI Module—FIG. 5

In FIG. 5, a typical one of the SI modules 58, representative of each of the modules in FIG. 4 is shown. Specifically, the input bits 59-A provide the most significant bits (MSB) to each of two outputs 60-A and 60-B. The least significant bit (LSB) for the first output 60-A is a logical 0 so that effectively the output on line 60-A is the input on 59-A muliplied by two. The second output 60-B has the LSB added in as a logical one so that the output on line 60-B is the input on lines 59-A multiplied by two and incremented by one. Note that no actual multiplication or addition is required, per se, since multiplication and addition is achieved by merely adding in a 1 or a 0 for the least significant bit (LSB). In FIG. 5 if the number of input bits on line 59-A is d, then the number of output bits on each of the lines 60-A and 60-B is d+1 where the added bit in each case is the LSB.

When the shift and increment unit of 58 of FIG. 5 is employed in the FIG. 4 seed generator, the operation is as follows. It is assumed that the $A_1$ array is loaded with the values $A_{1,1}$ as a 0 and $A_{1,2}$ as a 1. With this starting condition, the arrays $A_1$, $A_2$, and $A_3$ appear with the values in the following TABLE 5:

TABLE 5

| $A_1$ | $A_2$ | $A_3$ |
|---|---|---|
| $A_{1,1} = 0$ | $A_{2,1} = 00$ | $A_{3,1} = 000$ |
| $A_{1,2} = 1$ | $A_{2,2} = 10$ | $A_{3,2} = 100$ |
|  | $A_{2,3} = 01$ | $A_{3,3} = 010$ |
|  | $A_{2,4} = 11$ | $A_{3,4} = 110$ |
|  |  | $A_{3,5} = 001$ |
|  |  | $A_{3,6} = 101$ |
|  |  | $A_{3,7} = 011$ |
|  |  | $A_{3,8} = 111$ |

In TABLE 5, note that the permutation for the $A_3$ array is the same as previously described in connection with TABLE A for P=3 and N=8.

Stored Seed Table—FIG. 6

In FIG. 6, the seed table generated in any manner, for example in the manner described in connection with FIG. 4, can be stored in a read-only memory 73. The read-only memory 73 is then addressed by an address register 74 which selects the appropriate entry in memory 73 for the particular value P. Selection gates 75 select the outputs from the memory 73 for loading over the lines 45 into the seed register 42. If the ROM 73 is organized with a wide data output, then the seed register 42 can be eliminated and the output from the ROM 73 can be used directly as an input to the permute generator 43.

Permute Generator—FIG. 7

One embodiment of the permute generator 43 within the permute control 40 of FIG. 3 is shown in further detail in FIG. 7. The seed register (SR) output on lines 46 provides the input to the permute generator. The permute generator in turn provides the outputs on lines 47 which connect as inputs to the permute register 44 of FIG. 3. The lines 47 are organized in the line groups 47-1, 47-2, ..., 47-Y where Y equals the total number, N, divided by the number per group, (2G+2), that is, Y equals N/(2G+2). In FIG. 7, each seed table input is multiplied by n and the product stored in the 0 group $AG_0$ array 64.

In a simplified example, the $A_2$ array from TABLE 5, as generated by the FIG. 4 seed generator, is selected as the seed table. The contents of the seed table in the seed register (SR) 42 and the contents of the zero group, $AG_0$, in array 64 are shown in the following TABLE 6:

TABLE 6

| SR | | AG | |
|---|---|---|---|
| $00_2$ | $0_{10}$ | $0000_2$ | $0_{10}$ |
| $10_2$ | $2_{10}$ | $1000_2$ | $8_{10}$ |
| $01_2$ | $1_{10}$ | $0100_2$ | $4_{10}$ |
| $11_2$ | $3_{10}$ | $1100_2$ | $12_{10}$ |

In FIG. 7, the shifters 63-1 through 63-Y, where Y is $4_{10}$ in the example described, shift each of the SR entries two places to the left (a multiply by n=4).

With the zero group calculated and stored in array 64, the arithmetic units 65-1 through 65-Y of FIG. 7 calculate directly the permutation by adding the offset to the contents of the zero group array 64. For example, the arithmetic unit 65-1 receives each of the values (C input) stored in the array 64 (four in the present example) and one of the offset values (A input) from the seed table on lines 46. Each arithmetic unit then calculates a permutation value (A+C) which can be stored directly into the permutation register 44 of FIG. 3.

Airthmetic Unit—FIG. 8

In FIG. 8, an arithmetic unit 65 typical of each of the arithmetic units 65-1 through 65-Y in FIG. 7 is shown. In FIG. 8, each one of the values from the $AG_0$ array 64 connects to a different one of the adder/comparator (AC) units 69 including units 69-1, 69-2, . . . , 69-X where X is the number of elements in a group. For example, referring to TABLE 6, the $0000_2$ value connects to the C input of the AC unit 69-1, the $1000_2$ input connects to the AC unit 69-2 and so forth until the $1100_2$ input connects to the AC unit 69-4 where X is equal to 4.

In FIG. 8, when the AU unit 65 represents the unit 65-1 of FIG. 7, the A input to the AC units 69-1 through 69-4 is the first seed table offset value $00_2$.

The C input to each of the AC units 69-1 through 69-4 of FIG. 8 is a different one of the $AG_0$ array 64 values. The A and C inputs for the AC units 69-1 through 69-4 are shown in the following TABLE 7:

TABLE 7

|   | AU = 65-1 | | | |
|---|---|---|---|---|
|   | 69-1 | 69-2 | 69-3 | 69-4 |
| I | 00 | 00 | 00 | 00 |
| A | 00 | 00 | 00 | 00 |
| B | 00 | 10 | 01 | 11 |
| C | 0000 | 1000 | 0100 | 1100 |
| A+C | 0000 | 1000 | 0100 | 1100 |
| B>I | NO | YES | YES | YES |

In TABLE 7 and referring to FIG. 8, the circuits 69-1 through 69-4 function to add the A and C inputs to form the A+C value as the D output on lines 76-1, 76-2, . . . , 76-4.

Presently, the I input to the AC circuits 69-1 through 69-4 is ignored and not used.

In a similar manner, when the AU module of FIG. 8 represents the unit 65-2 of FIG. 7, the A input to the AC units 69-1 through 69-4 is the offset value $10_2$. With this offset value, the FIG. 8 unit calculates the A+C values as shown in the following TABLE 8:

TABLE 8

|   | AU = 65-2 | | | |
|---|---|---|---|---|
|   | 69-1 | 69-2 | 69-3 | 69-4 |
| I | 01 | 01 | 01 | 01 |
| A | 10 | 10 | 10 | 10 |
| B | 00 | 10 | 01 | 11 |
| C | 0000 | 1000 | 0100 | 1100 |
| A+C | 0010 | 1010 | 0110 | 1110 |
| B>I | NO | YES | NO | YES |

In a similar manner, the FIG. 8 unit acting as the AU units 65-3 and 65-4 are shown in the following TABLE 9 and TABLE 10:

TABLE 9

|   | AU = 65-3 | | | |
|---|---|---|---|---|
|   | 69-1 | 69-2 | 69-3 | 69-4 |
| I | 10 | 10 | 10 | 10 |
| A | 01 | 01 | 01 | 01 |
| B | 00 | 10 | 01 | 11 |
| C | 0000 | 1000 | 0100 | 1100 |
| A+C | 0001 | 1001 | 0101 | 1101 |
| B>I | NO | NO | NO | YES |

TABLE 10

|   | AU = 65-4 | | | |
|---|---|---|---|---|
|   | 69-1 | 69-2 | 69-3 | 69-4 |
| I | 11 | 11 | 11 | 11 |
| A | 11 | 11 | 11 | 11 |
| B | 00 | 10 | 01 | 11 |
| C | 0000 | 1000 | 0100 | 1100 |
| A+C | 0011 | 1011 | 0111 | 1111 |
| B>I | NO | NO | NO | NO |

AC Unit—FIG. 9

In FIG. 9, an AC unit typical of the units 69-1 through 69-X of FIG. 8 is shown. In the FIG. 9 unit, normally the multiplexer 72 and the comparator 71 need not be employed so that the D output is merely the A+C output from the adder 70. With this simplified structure, the AC unit 69 merely functions as an adder so that each entry into the register 44 of FIGS. 3 and 7 is directly calculated. With this operation, more additions and calculations are performed then the minimum number required to implement the permutation. In order to reduce the number of adders and other circuitry, the mutiplexer 72 and the comparator 71 are employed. Comparator 71 receives the high-order bits of the C input, which is the offset value before shift by n, and it compares it with the I input which is the i index value. If B is greater than I, then as previously indicated in TABLE 3, no swap is required and hence no addition is required. Comparator 71, under the condition that the B input is greater than the I input, satisfies multiplexer 72 such that the A+C output is not connected to the D output. When the full FIG. 9 circuit is employed, the outputs from the FIG. 9 circuit and FIG. 8 circuit are input selectively to the register 44 in a manner to be hereinafter described. In TABLE 7, TABLE 8, TABLE 9 and TABLE 10, the value of the I and the B inputs are shown. Further in those tables the YES and NO condition which is determined by the inequality "B greater than I" is also shown. The result of the YES and NO inequality of the tables corresponds to the same condition as previously set forth in TABLE 3.

Figure 10:
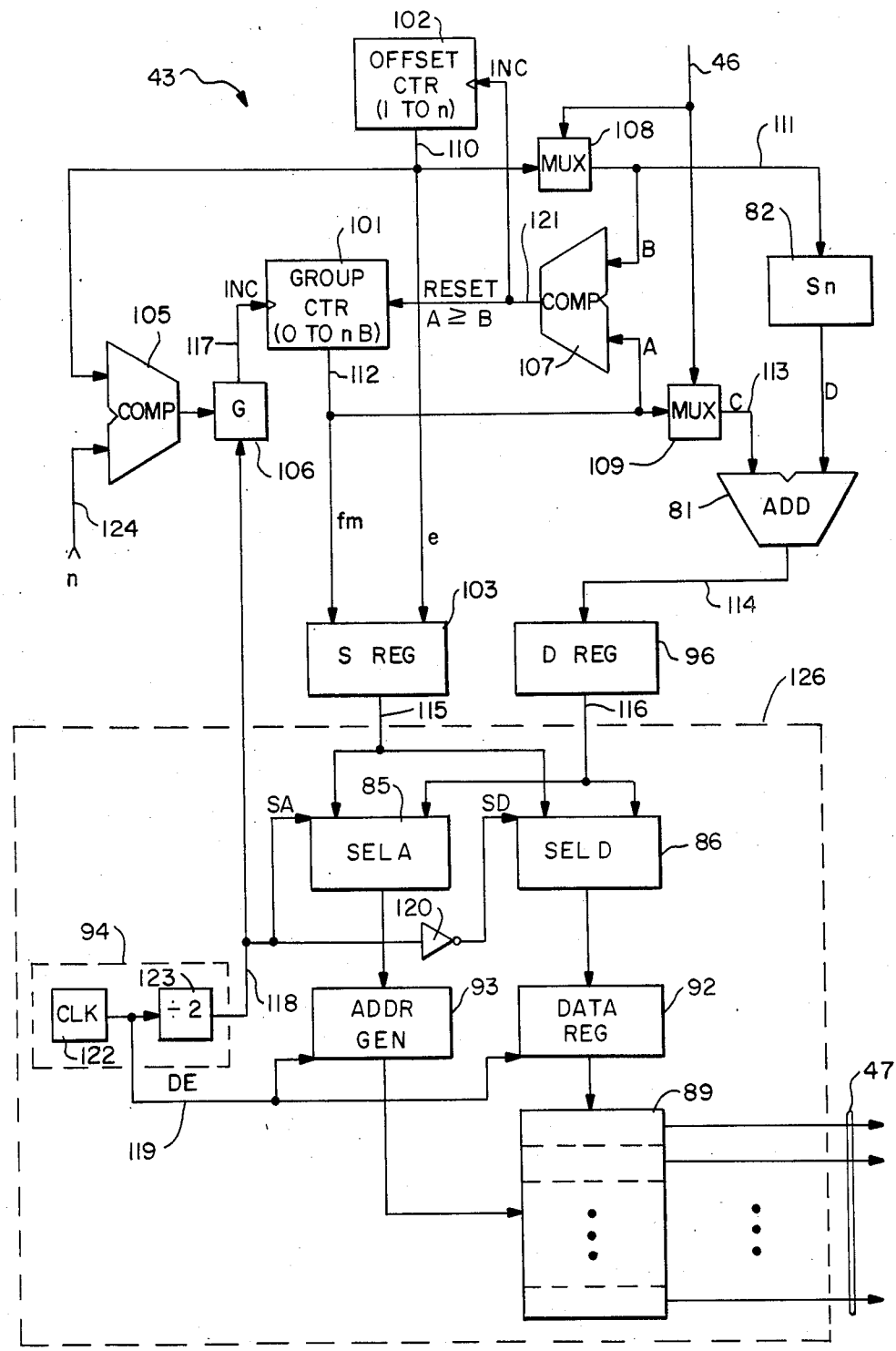
FIG. 10 depicts an alternate embodiment of the permute generator which forms part of the permute control of FIG. 3.

Alternate Permute Generator—FIG. 10

In FIG. 10, an alternate permute generator 43 for use in the permute control 40 of FIG. 3 is shown. In FIG. 10, the seed table output (seed[]) on lines 46 is input to the selection multiplexers 108 and 109. One value at a time on lines 46 from the seed register 42 of FIG. 3 is selected by each of the selection multiplexers 108 and 109 of FIG. 10.

In FIG. 10, an offset counter 102 provides an output count (groupNumber) on lines 110. Counter 102 is stepped through the offset counts 1, 2, . . . , n and is incremented by a signal on line 121 from a comparator 107.

In FIG. 10 the group counter 101 provides a group count on the output lines 112. Group counter 101 is counted through the group count values 0, 1, 2, . . . , nB under control of an increment signal on line 117.

The increment signal on line 117 is provided by a gate 106 whenever the gate 106 is enabled by the output from a comparator 105. Gate 106 receives the increment signal from line 118 which is provided by the clock unit 94. The clock unit 94 includes a clock 122 which provides the clock signal on line 119 to a divider 123 which divides the clock signal by 2 to provide the incrementing signal on line 118.

In FIG. 10, the function of comparator 105 is to compare the offset count (offset) in counter 102 with the value of n on input line 124. If the count on line 110 is less than n on line 124, comparator 105 provides an output to enable the gate 106. The group counter 101 is reset by operation of the output on line 121 from the comparator 107.

Comparator 107 functions to compare the count on line 112 from the group counter 101 with the seed table value selected by the multiplexer 108.

The reset signal on line 121 from comparator 107 is asserted whenever the group count (groupNumber) on line 112 is greater than or equal to the seed table value (seed[offset]) on lines 111. A resetting of the group counter 101 is concurrent with an incrementing of the offset counter 102 which is incremented by the same signal on line 121 from comparator 107.

In FIG. 10, the seed table value selected under control of the offset value in counter 102 by multiplexer 108 on line 111 is left shifted in the shifter 82, and thereby multiplied by a power of the base B, and provided as one input to the adder 81. The shifter 82 in FIG. 10 is like the shifters 63 in FIG. 7. In the example described, the left shift is two bits (multiply by $2^n=4$). The shifter 82 effectively multiplies its input on lines 111 by n. It shifts (base B) its input on lines 111 P/2 places if P is even, or (P−1)/2 places if P is odd, and the result appears as an output on the lines input to adder 81. In a similar manner to multiplexer 108, a seed table value is selected by multiplexer 109 as a function of the group count from counter 101. The selected seed table value (seed[groupNumber]) appears on lines 113 as the other input to the adder 81. Adder 81 adds the values from multiplexer 109 and shifter 82 to form the destination value $i_d$ in the D register 96 which is the j indicie $j_s$ corresponding to the selected i indicie, $i_s$.

In FIG. 10, the selected value $i_s$ in the S register 103 is formed by two fields. The low-order field, e, is derived from the offset counter 102 via lines 110. The high-order value, fm, is derived on lines 112 from the group counter 101.

In FIG. 10, the swapping unit 126 utilizes the selected i values, $i_s$, in S register 103 and the corresponding selected j values, $j_s$, in the D register 96 to swap the $i_s$ and $j_s$ values in the array 89. While the swapping can be carried out in the swapping unit 126, the values of $i_s$ and $i_d$ determined for entry into the S register 103 and the D register 96 can be employed with other apparatus, such as a computer, for the reordering of values in connection with a discrete transform without use of swapping unit 126.

The address selection circuit (SEL A) 85 selects the address for storage in the address register 93 from either the S register 103 or the D register 96. The data selection circuit (SEL D) 86 selects the value of $i_s$ or $j_s$ for the data register 92 from either the S register 103 or the D register 96. The address selection circuit 85 selects the address under control of the SA signal from control 94. When SA is asserted, the $i_s$ value from the S register 103 is latched into the address register 93 and when not asserted (=D), the $j_s$ value from D register 96 is latched into the address register 93. The data selection circuit 86 functions under control of the SD signal. Whenever SD is asserted (=S), the $i_s$ value from the S register 103 is latched into the data register 92 and when not asserted (=S), the $j_s$ value from the D register 96 is latched into the data register 92.

The contents of the data register 92 are gated out to be stored in the array 89 when the DE signal from the control 94 is asserted. Whenever DE is not asserted, no data is written into the array 89. The location at which data in register 92 is written into the array 89 is determined by the contents of the address register 93. The logical states of the control signals for controlling the operation of the FIG. 10 circuit appear in the following TABLE 11:

TABLE 11

| SA = D | and | SD = S | when | j>i |
| SA = S | and | SD = D | when | j>i |
| DE = 1 | | | when | j≧i |

The operation of the circuit of FIG. 10 is summarized in the following TABLE 12 where TABLE 12 represents the same example as TABLE 3.

TABLE 12 is an example where $N=B^P=2^4=16$; $n=N^{\frac{1}{2}}$; lines 124=n=4; lines 46=0, 2, 1, 3; B=2; P=4; and $S_n$ multiplies by 4 (left shift twice).

TABLE 12

| L | L 118 | L 117 | L 121 | A L 112 | L 110 | S-REG (103) | B L 111 | L D (S-82 output) | L 113 | D-REG (96) |
| --- | --- | --- | --- | --- | --- | --- | --- | --- | --- | --- |
| 1 | 0 | 0 | 0 | 00 (0) | 01 (1) | 0001 (1) | 10 (2) | 1000 (8) | 00 (0) | 1000 (8) |
| 2 | 1 | 1 | 0 | 01 (1) | 01 (1) | 0101 (5) | 10 (2) | 1000 (8) | 10 (2) | 1010 (10) |
| 3 | 0 | 0 | 0 | 01 (1) | 01 (1) | 0101 (5) | 10 (2) | 1000 (8) | 10 (2) | 1010 (10) |
| 4* | 1 | 1 | 0 | 10 (2) | — | — | 10 (2) | — | — | — |
| 5* | 1 | 1 | 1 | 00 (0) | 10 (2) | 0010 (2) | 01 (1) | 0100 (4) | 00 (0) | 0100 (4) |
| 6 | 1 | 1 | 0 | 00 (0) | 10 (2) | 0010 (2) | 01 (1) | 0100 (4) | 00 (0) | 0100 (4) |
| 7 | 0 | 0 | 0 | 00 (0) | 10 (2) | 0010 (2) | 01 (1) | 0100 (4) | 00 (0) | 0100 (4) |
| 8* | 1 | 1 | 0 | 01 (1) | — | — | 01 (1) | — | — | — |
| 9* | 1 | 1 | 1 | 00 (0) | 11 (3) | 0011 (3) | 11 (3) | 1100 (12) | 00 (0) | 1100 (12) |
| 10 | 1 | 1 | 0 | 00 (0) | 11 (3) | 0011 (3) | 11 (3) | 1100 (12) | 00 (0) | 1100 (12) |
| 11 | 0 | 0 | 0 | 00 (0) | 11 (3) | 0011 (3) | 11 (3) | 1100 (12) | 00 (0) | 1100 (12) |
| 12 | 1 | 1 | 0 | 01 (1) | 11 (3) | 0111 (7) | 11 (3) | 1100 (12) | 10 (2) | 1110 (14) |
| 13 | 0 | 0 | 0 | 01 (1) | 11 (3) | 0111 (7) | 11 (3) | 1100 (12) | 10 (2) | 1110 (14) |
| 14 | 1 | 1 | 0 | 10 (2) | 11 (3) | 1011 (11) | 11 (3) | 1100 (12) | 01 (1) | 1101 (13) |
| 15 | 0 | 0 | 0 | 10 (2) | 11 (3) | 1011 (11) | 11 (3) | 1100 (12) | 01 (1) | 1101 (13) |
| 16* | 1 | 1 | 0 | 11 (3) | — | — | 11 (3) | — | — | — |
| 17* | 1 | 1 | 1 | 00 (0) | 100 (4) | 0000 (0) | ? | ? | 00 (0) | ? |
| 18 | 1 | 0 | ? | 00 (0) | 100 (4) | 0000 (0) | ? | ? | 00 (0) | ? |

In TABLE 12, line (L) 1 is the initial state, lines 4*, 5*, 8*, 9*, 16* and 17* are intermediate unstable states.

At line 18, the TABLE 12 is waiting to be reset. The numbers in parentheses () in the table and in the column labelled L are in base 10, the other numbers are in base 2.

FIG. 11 depicts a graph depicting the performance of the present invention compared with the performance of the TABLE C permutation program.

While the invention has been particularly shown and described with reference to preferred embodiments thereof, it will be understood by those skilled in the art that the foregoing and other changes in form an detail may be made therein without departing from the spirit and scope of the invention.

What is claimed is:

1. An apparatus for the digit-reverse reordering of an N-valued initial sequence having elements $x_i$ in the order $x_0, x_1, \ldots, x_i, \ldots x_{(N-1)}$ to form a reordered sequence having elements $x_j$ in the order $x_0, x_1, \ldots, x_j, \ldots, x_{(N-1)}$ where i and j are indices formed of P base-B digits, $b_k$, as $i=(b_P b_{P-1}, \ldots, b_k, \ldots, b_2 b_1)$ where k has values P, P−1, ..., 2, 1 and $j=(b_1 b_2, \ldots, b_k, \ldots, b_{P-1} b_P)$ where k has values 1, 2, ..., P−1, P, where B is greater than or equal to 2, where N equals $B^P$, and where B and P are integers comprising:
means for providing seed values where the seed values are a function of P,
means for calculating the digit reversed pairs of indices i and j based upon said seed values.

2. The apparatus of claim 1 wherein said means for calculating includes first means for calculating the i indices based upon said seed values.

3. The apparatus of claim 1 wherein said means for calculating includes second means for calculating the j indices based upon said seed values.

4. The apparatus of claim 1 wherein said means for calculating includes first means for calculating the i indices based upon said seed values, and includes second means for calculating the j indices based upon said seed values.

5. The apparatus of claim 4 wherein said first means includes means for determining selected values $i_s$ of i which are to be digit reversed with corresponding values $j_s$ of j and wherein said second means operates to calculate said values $j_s$ corresponding to said selected values $i_s$.

6. The apparatus of claim 5 wherein said second means includes a multiplier for multiplying seed values by a power of B to form products and an adder for adding seed values to said products to form said values $j_s$.

7. An apparatus for digit-reverse reordering of a N-valued initial sequence having elements $x_i$ in the order $x_0, x_1, \ldots, x_i, \ldots, x_{(N-1)}$ to form a reordered sequence having elements $x_j$ in the order $x_0, x_1, \ldots, x_{(N-1)}$ where i and j are indices formed of P base-B digits, $b_k$, as $i=(b_P b_{P-1}, \ldots, b_k, \ldots, b_2 b_1)$ where k has values P, P−1, ..., 2, 1 and $j=(b_1 b_2, \ldots, b_k, \ldots, b_{P-1} b_P)$ where k has values 1, 2, ..., P−1, P where B is greater than or equal to 2, where N equals $B^P$, and where B and P are integers comprising:
means for providing seed values where the seed values are a function of P,
calculating means for calculating the digit reversed pairs of indices i and j based upon said seed values, said calculating means including first means for forming first selected values $i_s$ of i where $i_s$ is formed by least significant bits and by most significant bits, including group means receiving said seed values for forming said most significant bits of $i_s$, and including offset means receiving said seed values for forming said least significant bits of $i_s$, said calculating means including second means for forming values $j_s$ of j where a corresponding value of $j_s$ is formed for each value of $i_s$.

8. The apparatus of claim 7 wherein for said first means, said group means includes a group counter for counting from 0 to nB, said offset means includes an offset counter for counting from 1 to n, where n equals $N^{\frac{1}{2}}$ if P is even and equal $(N/B)^{\frac{1}{2}}$ if P is odd, and wherein said first means includes,
means for incrementing said group counter whenever said offset counter equals n, means for incrementing said offset counter whenever the offset counter stores a count equal to or greater than a selected seed table value, wherein said offset count and said group count form said indices $i_s$,
and wherein said second means includes,
first selector means for selecting a first seed value based upon the count in the group counter, second selector means for selecting a second seed value based upon the count in said offset counter, multiplier means for multiplying said second seed value by n to form a multiplied value, adder means for adding said first seed value and said multiplied value to form said $j_s$ value.

9. The apparatus of claim 8 including swapping means for swapping said values $i_s$ and $j_s$.

10. The apparatus of claim 9 wherein said swapping means includes,
an array for storing the initial sequence of indices,
an address register for addressing said array,
a data register for storing said $i_s$ and $j_s$ indices to be swapped in said array,
control means for alternately providing said indices $i_s$ and $j_s$ to said address register and said data register whereby after all of said $i_s$ and $j_s$ indices have been provided said array stores said reordered sequence.

11. A method for the digit-reverse reordering of an N-valued initial sequence having elements $x_i$ in the order $x_0, x_1, \ldots, x_i, \ldots, x_{(N-1)}$, to form a reordered sequence having elements $x_j$ in the order $x_0, x_1, \ldots, x_i, \ldots, x_{(N-1)}$ where i and j are indices formed of P base-B digits, $b_k$, as $i=(b_P b_{P-1}, \ldots, b_k, \ldots, b_2 b_1)$ where k has values P, P−1, ..., 2, 1 and $j=(b_1 b_2, \ldots, b_k, \ldots, b_{P-1} b_P)$ where k has values 1, 2, ..., P−1, P, where B is greater than or equal to 2, where N equals $B^P$, and where B and P are integers comprising:
providing seed values where the seed values are a function of P,
calculating the digit reversed pairs of indices i and j based upon said seed values.

12. The method of claim 11 wherein said calculating step includes a step of calculating the i indices based upon said seed values.

13. The method of claim 11 wherein said calculating step includes a step of calculating the j indices based upon said seed values.

14. The method of claim 11 wherein said calculating step includes a first step of calculating the i indices based upon said seed values, and includes a second step of calculating the j indices based upon said seed values.

15. The method of claim 14 wherein said first step includes the step of determining selected values of i which are to be digit reversed with values of j and wherein said second step operates to calculate values of j corresponding to said selected values of i.

16. The method of claim 15 wherein said second step multiplies seed values by a power of B to form products and adds seed values to said products to form said j indices.

17. A method for the digit-reverse reordering of a N-valued initial sequence having elments $x_i$ in the order $x_0, x_1, \ldots, x_i, \ldots, x_{(N-1)}$ to form a reordered sequence having elements $x_j$ in the order $x_0, x_1, \ldots, x_j, \ldots, x_{(N-1)}$ where i and j are indices formed of P base-B digits, $b_k$, as $i=(b_P b_{P-1}, \ldots, b_k, \ldots, b_2 b_1)$ where k has values $P, P-1, \ldots, 2, 1$ and $j=(b_1 b_2, \ldots, b_k, \ldots, b_{P-1} b_P)$ where k has values $1, 2, \ldots, P-1, P$ where B is greater than or equal to 2, where N equals $B^P$, and where B and P are integers comprising:

providing seed values where the seed values are a function of P, calculating the digit reversed pairs of indices i and j based upon said seed values, said calculating step including a first step forming first selected values $i_s$ of i where $i_s$ is formed by least significant bits and most significant bits, including a group step receiving said seed values to form the most significant bits of $i_s$, and including an offset step receiving said seed values to form the least significant bits of $i_s$, said calculating step including a second step forming values of $j_s$ for each value of $i_s$.

18. The method of claim 17 wherein for said first step, said group step counts from 0 to nB, wherein said offset step includes counting an offset from 1 to n, where n equals $N^{\frac{1}{2}}$ if P is even and equal $(N/B)^{\frac{1}{2}}$ if P is odd, and includes the steps of incrementing said group count whenever said offset count equals n, incrementing said offset count whenever the offset count is equal to or greater than a selected seed table value, wherein said offset count and said group count form said indices $i_s$, and wherein said second step includes, selecting a first seed value based upon the group count, selecting a second seed value based upon said offset count, multiplying said second seed value by n to form a multiplied value, adding said first seed value and said multiplied value to form said $j_s$ value.

19. The method of claim 18 including swapping said values $i_s$ and $j_s$.

20. The method of claim 19 wherein said swapping step includes the steps of, storing the initial sequence in an array, addressing said array, providing indices to be written into said array, receiving the indices $i_s$ and $j_s$ for alternately providing said indices to address said array and to store data into said array whereby said array stores said reordered sequence.

* * * * *